(12) United States Patent
Takatsuka

(10) Patent No.: US 8,054,291 B2
(45) Date of Patent: Nov. 8, 2011

(54) POINTING DEVICE

(75) Inventor: Toshinori Takatsuka, Fuji (JP)

(73) Assignee: Asahi Kasei EMD Corporation, Tokyo (JP)

( * ) Notice: Subject to any disclaimer, the term of this patent is extended or adjusted under 35 U.S.C. 154(b) by 0 days.

(21) Appl. No.: 10/542,643

(22) PCT Filed: Jan. 16, 2004

(86) PCT No.: PCT/JP2004/000272
§ 371 (c)(1),
(2), (4) Date: Jul. 19, 2005

(87) PCT Pub. No.: WO2004/066138
PCT Pub. Date: Aug. 5, 2004

(65) Prior Publication Data
US 2006/0050053 A1    Mar. 9, 2006

(30) Foreign Application Priority Data

Jan. 20, 2003  (JP) ................................ 2003-011291

(51) Int. Cl.
*G09G 5/00*   (2006.01)
(52) U.S. Cl. ........ 345/157; 345/158; 345/160; 345/161; 345/162; 324/207.24; 178/18.07
(58) Field of Classification Search .................. 345/156, 345/161–167; 178/18.07
See application file for complete search history.

(56) References Cited

U.S. PATENT DOCUMENTS

| | | | | |
|---|---|---|---|---|
| 4,029,899 A | * | 6/1977 | Gordon ............................. | 341/5 |
| 4,459,578 A | | 7/1984 | Sava et al. | |
| 4,462,594 A | | 7/1984 | Bromley et al. | |
| 4,482,784 A | * | 11/1984 | Whetstone ................. | 178/18.06 |
| 4,795,858 A | * | 1/1989 | Yamazaki .................. | 178/18.07 |
| 5,179,460 A | | 1/1993 | Hinata et al. | |
| 5,504,502 A | * | 4/1996 | Arita et al. ..................... | 345/160 |

(Continued)

FOREIGN PATENT DOCUMENTS

EP   1193643 A1   4/2002

(Continued)

OTHER PUBLICATIONS

European Patent Office Report, Nov. 23, 2005, European Application No. 02718620, 4-2211 PCT, 3 pgs.

(Continued)

*Primary Examiner* — Grant Sitta
(74) *Attorney, Agent, or Firm* — Finnegan, Henderson, Farabow, Garrett & Dunner, LLP

(57) ABSTRACT

A pointing device is provided which can reduce its size and height, reduce leakage magnetic flux density to the outside. Magnetic sensors are disposed symmetrically two by two on X and Y axes on a printed circuit board. A silicone resin is placed on the printed circuit board, and an internally and externally unipolarly magnetized ring-like magnet is placed near the center of the magnetic sensors. The printed circuit board and silicone resin are not bonded. The silicone resin is easily deformed by applying external force, and returns to its initial state without the external force as soon as the external force is removed. The ring-like magnet is configured to move approximately in parallel to the surface of the printed circuit board. The variations in the ambient magnetic flux density produced by the movement of the ring-like magnet are detected by the magnetic sensors.

35 Claims, 14 Drawing Sheets

U.S. PATENT DOCUMENTS

| | | | |
|---|---|---|---|
| 5,506,558 A * | 4/1996 | Laube | 335/306 |
| 5,541,370 A * | 7/1996 | Matsuda et al. | 178/18.05 |
| 5,565,632 A | 10/1996 | Ogawa | |
| 5,973,668 A | 10/1999 | Watanabe | |
| 6,373,265 B1 | 4/2002 | Morimoto et al. | |
| 6,525,257 B1 * | 2/2003 | Hermann | 84/658 |
| 6,670,946 B2 | 12/2003 | Endo et al. | |
| 6,762,748 B2 * | 7/2004 | Maatta et al. | 345/157 |
| 6,864,679 B2 * | 3/2005 | Yokoji et al. | 324/207.11 |
| 2001/0006369 A1 * | 7/2001 | Ely | 341/20 |
| 2001/0055001 A1 * | 12/2001 | Sakamaki et al. | 345/156 |
| 2002/0054012 A1 * | 5/2002 | Endo et al. | 345/156 |
| 2004/0080491 A1 * | 4/2004 | Takatsuka et al. | 345/156 |

FOREIGN PATENT DOCUMENTS

| | | |
|---|---|---|
| EP | 1223541 A2 | 7/2002 |
| EP | 1380927 A1 | 1/2004 |
| JP | 58-066381 | 4/1983 |
| JP | 59-23420 | 2/1984 |
| JP | 59-053936 | 3/1984 |
| JP | 02-240716 | 9/1990 |
| JP | 04-125723 | 4/1992 |
| JP | 04-172521 | 6/1992 |
| JP | 06-035599 | 2/1994 |
| JP | 06-318134 | 11/1994 |
| JP | 08-152961 | 6/1996 |
| JP | 08-185257 | 7/1996 |
| JP | 09-34644 | 2/1997 |
| JP | 09-128139 | 5/1997 |
| JP | 09-265347 | 10/1997 |
| JP | 11-224568 | 8/1999 |
| JP | 2000-193538 | 7/2000 |
| JP | 2000-292271 | 10/2000 |
| JP | 2001-027570 | 1/2001 |
| JP | 2002-150904 | 5/2002 |
| JP | 2002-174532 | 6/2002 |
| JP | 2002-287891 | 10/2002 |
| WO | WO-02086694 | 10/2002 |
| WO | WO 02086694 A1 * | 10/2002 |

OTHER PUBLICATIONS

Office Action dated Nov. 15, 2007 in corresponding Korean Patent Application No. 10-2007-7017775.

Office Action dated Feb. 2, 2010 in corresponding European Patent Application No. 04702792.5. (7 pages).

European Supplementary Search Report dated Oct. 31, 2007 in the corresponding European Patent Application No. 04702792.5.

Official Action in Japanese Patent Application No. 2002-584148 dated May 22, 2007.

* cited by examiner

OUTPUT CHARACTERISTICS OF POINTING DEVICE @gapZ=1.6mm
(MAGNETIC FORCE SIZE: φ13×φ8.8×0.5t,
COERCIVE FORCE 460 kA/m, CALCULATED VALUES)

- gapX=0
- gapX=0.25
- gapX=0.5
- gapX=0.75

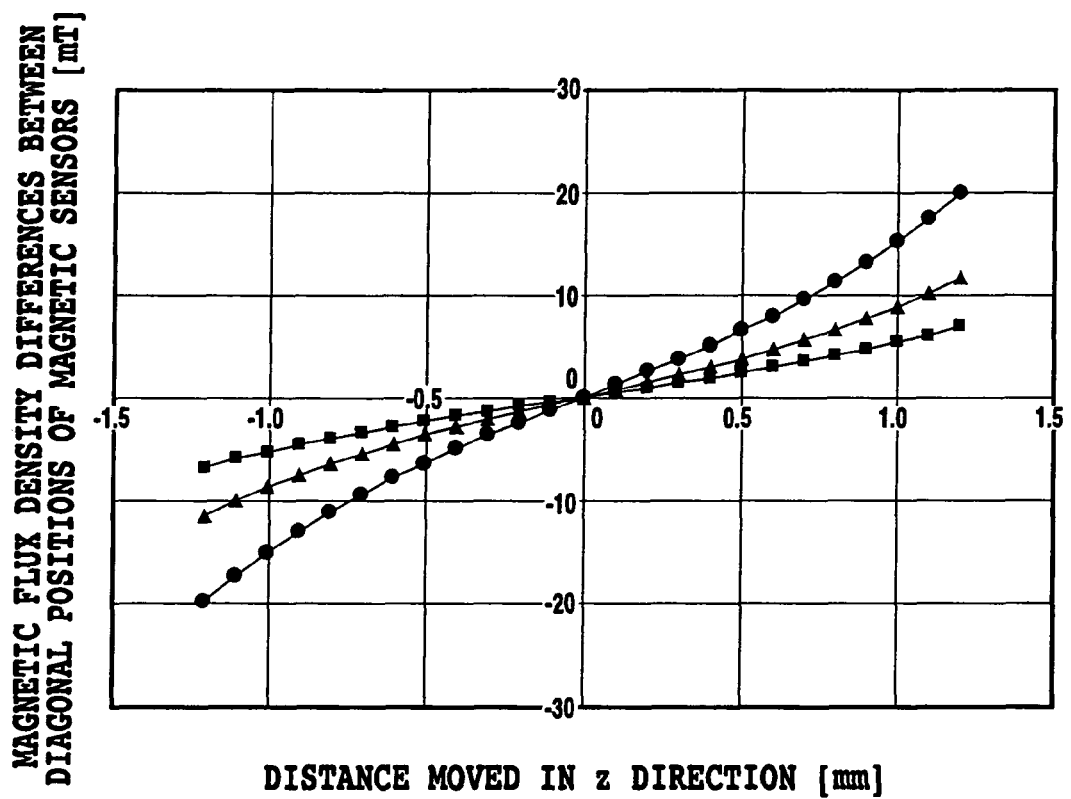
OUTPUT CHARACTERISTICS OF POINTING DEVICE
(MAGNETIC FORCE SIZE: φ11.78×φ5×0.485t, CALCULATED VALUES)
FIG.10
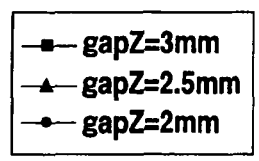

POINTING DEVICE

TECHNICAL FIELD

The present invention relates to a pointing device used as an input means of a personal computer, mobile phone and the like, and more particularly to a magnetic detection type pointing device for carrying out coordinate detection or inputting vector information by detecting ambient magnetic flux density variations due to the movement of a magnet.

BACKGROUND ART

FIG. 1 is a block diagram showing a magnetic detector circuit of a conventional magnetic detection type pointing device. A detecting section 1 includes four magnetic sensors (such as Hall elements, semiconductor magneto-resistive elements, thin-film magneto-resistive elements and GMR elements) 11, and the Hall elements 11 are placed symmetrically two by two on the X and Y axes. A magnet is placed near the center of the four Hall elements 11 symmetrically disposed on the X and Y axes. Because of the variations in the magnetic flux density due to the movement of the magnet, the output voltages of the Hall elements 11 vary.

Differential amplifiers 2 differentially amplify the outputs of the Hall elements 11 on the X and Y axes, respectively. The output is adjusted to zero when the magnetic flux density in the Z direction is symmetry with respect to the origin O, that is, when the magnetized direction of the magnet is in the vertical direction. As the magnet moves, the differential amplifiers 2 produce outputs, and a detection control section 3 converts the outputs (analog values) in the X coordinate value and Y coordinate value, which are output through an output control section 4.

As a concrete example of a small pointing device used by a mobile phone, a device is known which employs a scheme placing a magnet on a key mat. Such devices based on the method enable miniaturization among the currently proposed ideas (see Japanese patent application laid-open No. 2002-150904, for example).

As a contact type pointing device, a device is common which forms on a printed board two pairs of comb electrodes, and depresses them via a conductive rubber from the top to vary the current-passing state, thereby outputting coordinate values in digital values.

However, in small mobile electronic equipment such as a mobile phone, further reductions in size and height of the components are required to satisfy mutually contradictory needs of reducing the size and improving the function of the electronic equipment in its entirety. In addition, further improvement in operating feelings of the magnetic detection type pointing device is expected.

Furthermore, as for the foregoing publication, since the magnet is magnetized in the vertical direction, the magnetic flux density that leaks out is large so that when a magnetic card is brought close to it, a problem of losing the information of the magnetic card is likely to occur.

Moreover, since the input is made by depressing the conductive rubber in the contact type pointing device, degradation of the conductive rubber involved in repetitive input and the like is unavoidable, which presents a problem of reducing the life.

The present invention is implemented to solve the foregoing problems. Therefore it is an object of the present invention to provide a pointing device that can reduce the size and height, and provide a good operating feeling, and that has small external leakage of the magnetic flux density, and has a long product life.

DISCLOSURE OF THE INVENTION

To accomplish the object of the present invention, there is provided a pointing device characterized by comprising a ring-like magnet that is movably supported in parallel to a plane; and a plurality of magnetic sensors for detecting magnetic flux density produced by the ring-like magnet in a direction parallel to the plane, wherein the magnetic sensors detect variations in the magnetic flux density in the direction parallel to the plane, the variations being caused by movement of the ring-like magnet.

The ring-like magnet is characterized by internally and externally unipolarly magnetized.

The ring-like magnet is characterized by having at least one of its internal wall and external wall magnetized in a multipolar manner, and the magnetic sensors are characterized by facing to a magnetic pole center of the ring-like magnet magnetized in a multipolar manner.

The pointing device is characterized by further comprising a printed circuit board on which a resin layer is provided, wherein the ring-like magnet is fixed to the resin layer, and the magnetic sensors are placed on the printed circuit board.

The resin layer and the printed circuit board are characterized by having their opposing faces not bonded to each other.

The resin layer is characterized by being an elastic sheet.

The resin layer is characterized by being a silicone resin.

The magnetic sensors are characterized by being disposed symmetrically on X and Y axes, which are two axes on a two dimensional plane of an orthogonal system, and the ring-like magnet is characterized by being placed near the center of the magnetic sensors.

The pointing device is characterized by further comprising a switch on the resin layer side of the printed circuit board and at about the center of the ring-like magnet.

The pointing device is characterized by further comprising a projection for depressing the switch at a portion facing the switch on the resin layer.

The magnetic sensors are characterized by being magnetic sensors utilizing Hall effect, and outputting signals proportional to the magnetic flux density.

The magnetic sensors utilizing the Hall effect are characterized by being disposed on the resin layer side of the printed circuit board to detect the magnetic flux density in a direction parallel to the surface of the printed circuit board.

The magnetic sensors utilizing the Hall effect are characterized by being magnetic sensors with a single output terminal.

The magnetic sensors are characterized by being magnetic sensors utilizing magneto-resistive effect.

The magnetic sensors utilizing the magneto-resistive effect are characterized by being semiconductor magneto-resistive elements which are disposed on the resin layer side of the printed circuit board to detect the magnetic flux density in a direction parallel to the surface of the printed circuit board.

The magnetic sensors utilizing the magneto-resistive effect are characterized by being four semiconductor magneto-resistive elements disposed symmetrically on X and Y axes, which are two axes on a two dimensional plane of an orthogonal system, wherein two magnetic sensors on the X axis are electrically connected at a first connection point; and two magnetic sensors on the Y axis are electrically connected at a second connection point, and wherein the pointing device detects variations in ambient magnetic flux density caused by movement of the ring-like magnet using electric signals at the first and second connection points.

The pointing device is characterized by further comprising an origin returning means for returning the ring-like magnet to the origin using magnetic force generated by the ring-like magnet.

In addition, there is provided an electronic device incorporating the foregoing pointing device.

As the magnetic sensors, various types of magnetic sensors are applicable such as Hall elements, Hall ICs, magneto-resistive elements (MR devices), magneto-resistive effect ICs (MRICs), and reed switches. Analog output type magnetic sensors are suitable for an analog output type pointing device, and digital output type magnetic sensors are appropriate for a digital output type pointing device.

When the Hall elements are used, it is preferable that they are disposed on the resin layer side of the printed circuit board, and detect the magnetic flux density in the direction parallel to the surface of the printed circuit board to further reduce the size and height of the pointing device.

When the magnetic sensors utilizing the Hall effect are Hall ICs each having a single output terminal, the number of the output signal lines can be reduced compared with the number of those using the Hall elements, thereby being able to save the space of the printed circuit board, and to reduce the effect of external noise.

When the magnetic sensors utilizing the magneto-resistive effect are used, it is preferable that semiconductor magneto-resistive elements are employed which are disposed on the resin layer side of the printed circuit board, and detect the magnetic flux density in the direction parallel to the surface of the printed circuit board to further reduce the size and height of the pointing device.

In addition, it is also possible to dispose four semiconductor magneto-resistive elements symmetrically two by two on X and Y axes, which are two axes on a two dimensional plane of an orthogonal system; to electrically connect the two magnetic sensors on the X axis at a first connection point; to electrically connect the two magnetic sensors on the Y axis at a second connection point; and to detect variations in ambient magnetic flux density caused by the movement of the ring-like magnet using electric signals at the first and second connection points. Such a configuration enables the reduction in the number of the output signal lines as compared with the case where the Hall elements are used. Thus, it can save the space for the printed circuit board, and reduce the effect of the external noise.

Furthermore, the switch can be placed on the resin layer side of the printed circuit board. It is also possible to provide a projection for depressing the switch onto the resin layer portion facing the switch. Although no restraint is imposed on the type of the switch, such a switch is suitable which enables a user to confirm an object by utilizing physical contact with the object, such as tactile switch, push button switch, tact switch, touch switch and stroke switch, which allow the user to easily check pushing it (having tactile feedback), and automatically returns after depressing the switch. Thus, the tactile switch (also called dome switch) is preferable to reduce the size and height.

As for the ring-like magnet, no restraint is imposed on its type. Thus a variety of ring-like magnet such as ferrite, samarium-cobalt, and neodymium based magnet which are usually mass-produced are applicable. To miniaturize the pointing device, it is essential to reduce the size of the magnet. Accordingly, a samarium-cobalt or neodymium ring-like magnet which can produce intense magnetic field with a small body is preferable. In addition, to reduce the height of the magnet, a bonded magnet that is more easily molded is better than a bulk magnet. The shape is not limited to the ring-like form as long as magnetized in the same manner. Thus, cylindrical or prism-like shapes are also possible. However, using the ring-like magnet is preferable because this makes it possible to suppress the total height of the pointing device even when the switch is mounted on the printed circuit board.

As the resin layer, a resin having elasticity is preferable. Although no restraint is imposed on the type of the elastic resin, a silicone resin that is fit for a wide range of applications is preferable because it is inexpensive and easily available.

As for the ring-like magnet, it is preferable to construct it in such a manner that it produces the ambient magnetic flux density variations when moved in nearly parallel to the surface of the printed circuit board because this enables further reduction in the height of the pointing device.

It is preferable that the opposing faces of the resin layer and the printed circuit board are not bonded.

It is also preferable that the magnetic sensors are disposed symmetrically on the X and Y axes, the two axes on the two dimensional plane on the orthogonal system, and that the ring-like magnet be placed near the center of the magnetic sensors.

Besides, the origin returning means of the ring-like magnet can be provided. Although fixing the ring-like magnet to the resin layer can make one of such origin returning means, a magnet other than the ring-like magnet can be added to construct a mechanism for returning to the origin by utilizing the attractive force or repulsive force between the two magnets.

The foregoing configuration enables the reduction in size and height, the reduction in the leakage magnetic flux density to the outside, and the improvement in the operating feelings and in the product life. Thus, it can be suitably fitted to a variety of applications. Moreover, incorporating such a pointing device to electronic equipment can further reduce the size of the electronic equipment.

BRIEF DESCRIPTION OF THE DRAWINGS

FIG. 10 is a graph illustrating another output characteristic example of the pointing device with the configuration of the example 2;

BEST MODE FOR CARRYING OUT THE INVENTION

The embodiments in accordance with the present invention will now be described with reference to the accompanying drawings.

Figure 1:
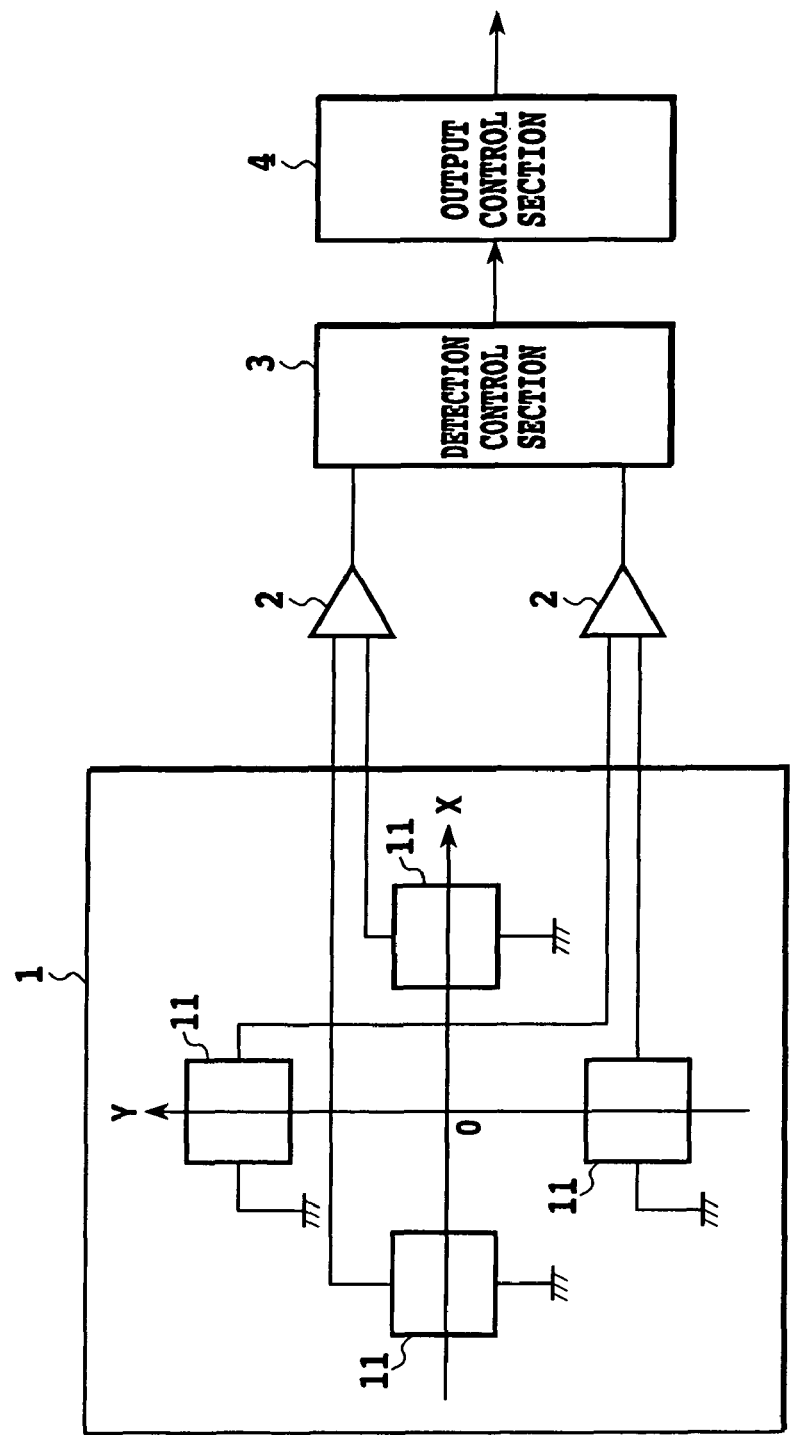
FIG. 1 is a circuit block diagram showing a configuration of a pointing device as a conventional example and as an example of a pointing device in accordance with the present invention.

A block diagram showing the magnetic detector circuit of the magnetic detection type pointing device in accordance with the present invention is the same as the conventional circuit block diagram as shown in FIG. 1. Thus, the detecting section 1 has four magnetic sensors (such as Hall elements) 11, and the Hall elements 11 are placed symmetrically two by two on the X and Y axes. Close to the center of the four Hall elements disposed symmetrically on the X and Y axes, a ring-like magnet is placed. Because of the variations in the magnetic flux density involved in the movement of the ring-like magnet, the output voltages of the Hall elements 11 vary.

The differential amplifiers 2 differentially amplify the outputs of the Hall elements 11 on the X axis and Y axis, respectively. The magnetic detector circuit is configured such that the outputs of the X and Y axes are adjusted to zero when the ring-like magnet which is an internally and externally unipolarly magnetized ring-like magnet is located on the origin; that the differential amplifiers 2 have outputs in response to the movement of the ring-like magnet; that the detection control section 3 converts the outputs (analog values) to the X coordinate value and Y coordinate value; and that the output control section 4 outputs them.

Figure 2A:
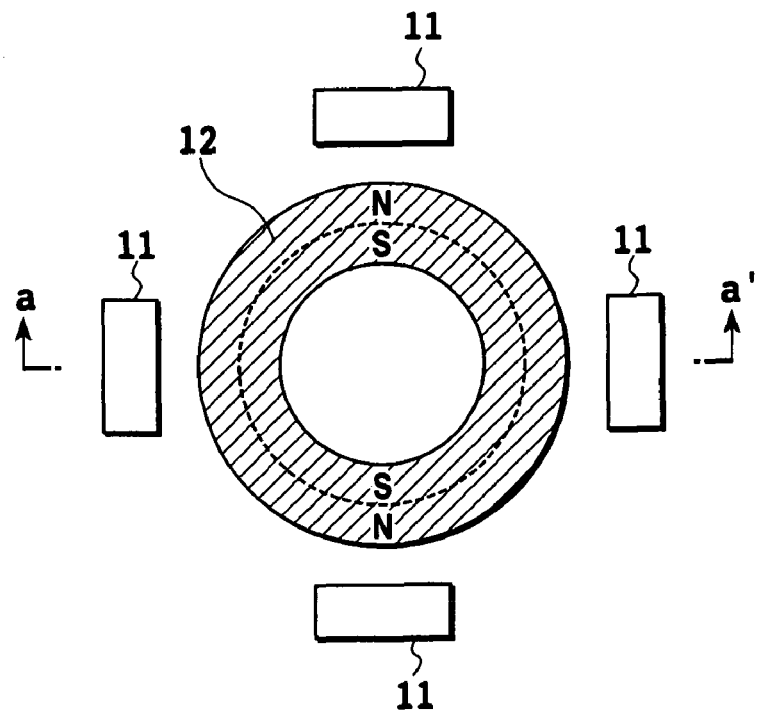
FIGS. 2A and 2B are views showing an embodiment of the pointing device in accordance with the present invention.
Figure 2B:
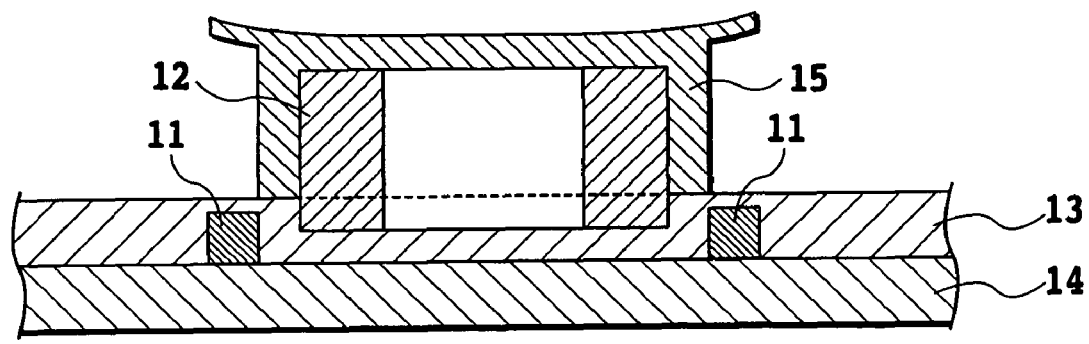

FIGS. 2A and 2B are views showing an embodiment of the pointing device in accordance with the present invention: FIG. 2A is a top view; and FIG. 2B is a cross-sectional view taken along the line IIB-IIB of FIG. 2A. In these figures, each reference numeral 11 designates a magnetic sensor, the reference numeral 12 designates a ring-like magnet, 13 designates a silicone resin, 14 designates a printed circuit board and 15 designates a switch cover. The magnetic sensors 11 are disposed two by two on the X and Y axes symmetrically on the printed circuit board 14 as described above. The magnetic sensors 11 detect the magnetic flux density in the direction parallel to the surface of the printed circuit board 14.

Although the magnetic sensors 11 are placed outside the ring magnet 12 in the configuration of FIG. 2A, they can be placed inside the ring magnet 12. By thus placing the magnetic sensors 11 inside the ring magnet 12, the pointing device can be further miniaturized. The ring-like magnet 12 is unipolarly magnetized in NS in the direction of its radius. Which of the magnetization NS is to be placed outside is not limited. In addition, the opposing faces of the silicone resin 13 and the printed circuit board 14 are not bonded.

The silicone resin 13 is easily deformed by external force, and is returned to its initial state without the external force by removing the external force. Thus, when the switch cover 15 is operated and moved in some direction, the ring-like magnet 12 moves in the same manner, and returns to its initial state as soon as the external force is removed. Using the silicone resin 13 enables the miniaturization of the moving mechanism and the origin returning means.

As for the movement of the ring-like magnet 12, a configuration which allows it to move in a direction approximately parallel to the surface of the printed circuit board 14 can reduce the height of the pointing device.

As for the fixing method of the ring-like magnet 12 to the silicone resin 13, a simple method using an adhesive can be employed. In this case, it is preferable to bond them without applying the adhesive to the entire contacting face between the ring-like magnet 12 and the silicone resin 13, but by applying to a portion except for portions close to the outer edge. This is because this makes it possible to effectively use the elasticity of the silicone resin 13 and to increase the movable range of the ring-like magnet 12. In addition, it is preferable that a concave portion be provided at the mounting location of the ring-like magnet 12 on silicone resin 13 because of a positioning problem of the ring-like magnet 12.

As for the molding of the silicone resin 13, the insert molding is possible to circumvent the need for bonding the ring-like magnet 12 after the molding.

Replacing the ring-like magnet 12 and silicone resin 13 by a rubber magnet enables further reduction in the height. The magnet can also be formed by mixing a magnetic material into part of the silicone resin 13.

In addition, comparing with a contact type pointing device, the magnetic detection type pointing device can increase its product life because it can eliminate abrasion between components due to contact.

Figure 3A:
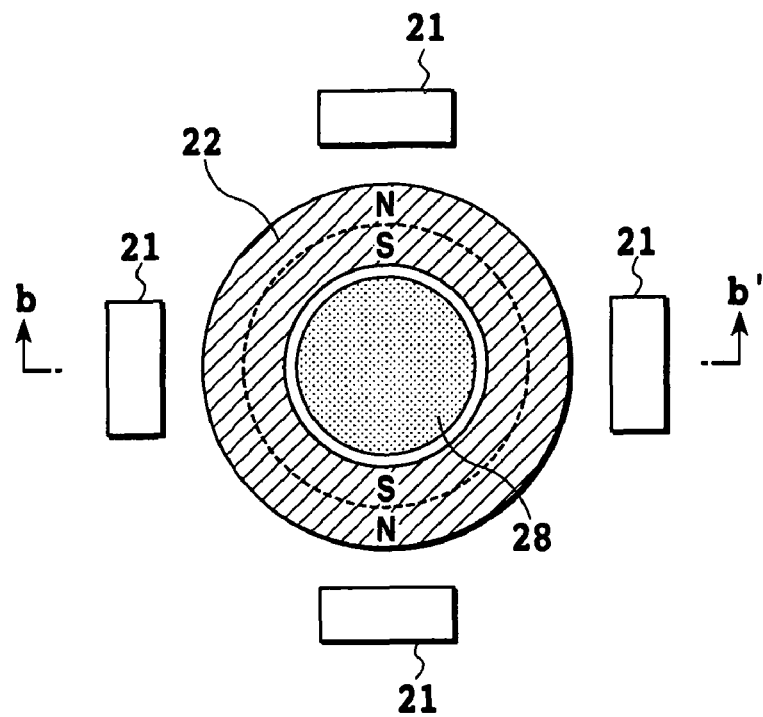
FIGS. 3A and 3B are views showing another embodiment of the pointing device in accordance with the present invention.
Figure 3B:
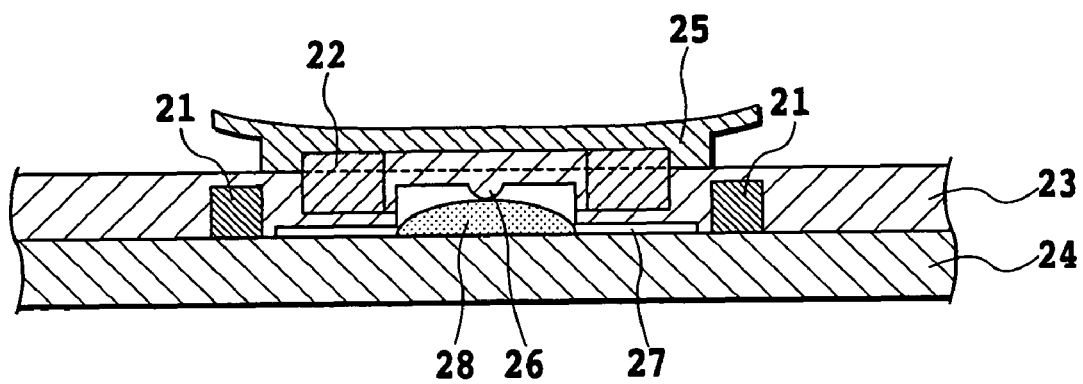

FIGS. 3A and 3B are views showing another embodiment of the pointing device in accordance with the present invention: FIG. 3A is a top view; and FIG. 3B is a cross sectional view taken along the line IIIB-IIIB of FIG. 3A. It is a pointing device provided with a switching function by forming a concave portion in a silicone resin 23 corresponding to the silicone resin 13 of the embodiment as shown in FIG. 2B, and by installing a switch 28 in the concave portion. In other words, it has the switch 28 on the silicone resin 23 side of the printed circuit board 24. The silicone resin 23 has a projection 26 for depressing the switch 28. Besides, the ring-like magnet 22 can reduce its height by using a neodymium bonded magnet.

Originally, although the pointing device is a device for outputting the coordinate values of an input point, the switching function makes a pointing device not only with the coordinate value output function, but also with a deciding function. It has a configuration that achieves the switching function by depressing the switch cover 25 in the direction of the ring-like magnet 22. Having the switch, it has two signals as a mouse for a personal computer: the coordinate values and the decision signal.

As the switch 28, any switch including a push button switch can be used. However, such switches as a tactile switch, tact switch, touch switch and stroke switch are suitable which enable easy checking of depression (with tactile feedback), and return automatically after the depression, and which confirm an object by utilizing physical contact with the object.

In addition, a gap 27 is formed by making the thickness of the silicone resin 23 in and around the portion on which the ring-like magnet 22 of the embodiment as shown in FIG. 3B is mounted thinner than the thickness of the portion of the silicone resin 23 on which the ring-like magnet 22 is not mounted. The thinner the silicone resin under the ring-like magnet 22, the greater the moving range of the ring-like magnet 22. Thus, it is preferable that the portion involved in the operation of the silicone resin 23 be made as thin as possible.

Figure 4A:
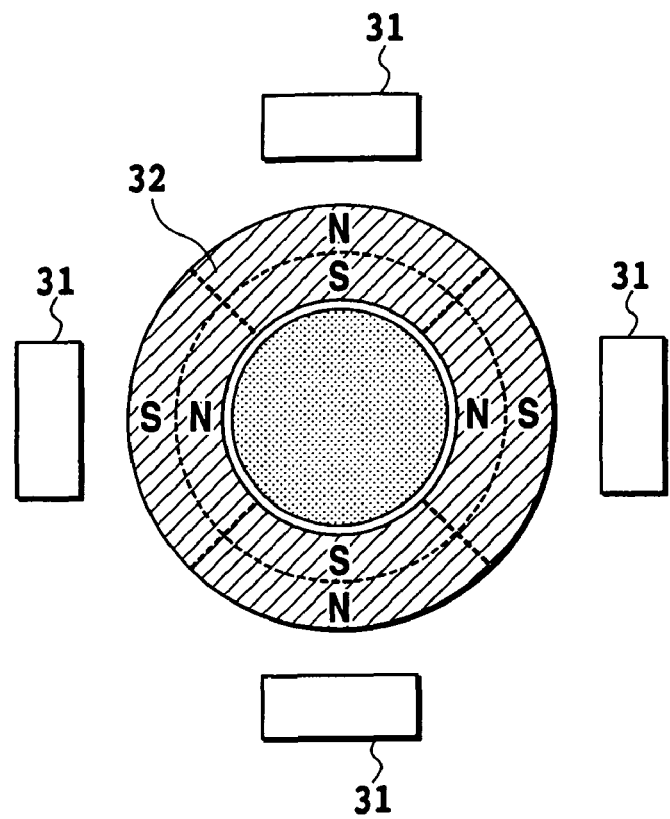
FIGS. 4A and 4B are views showing still another embodiment of the pointing device in accordance with the present invention.
Figure 4B:
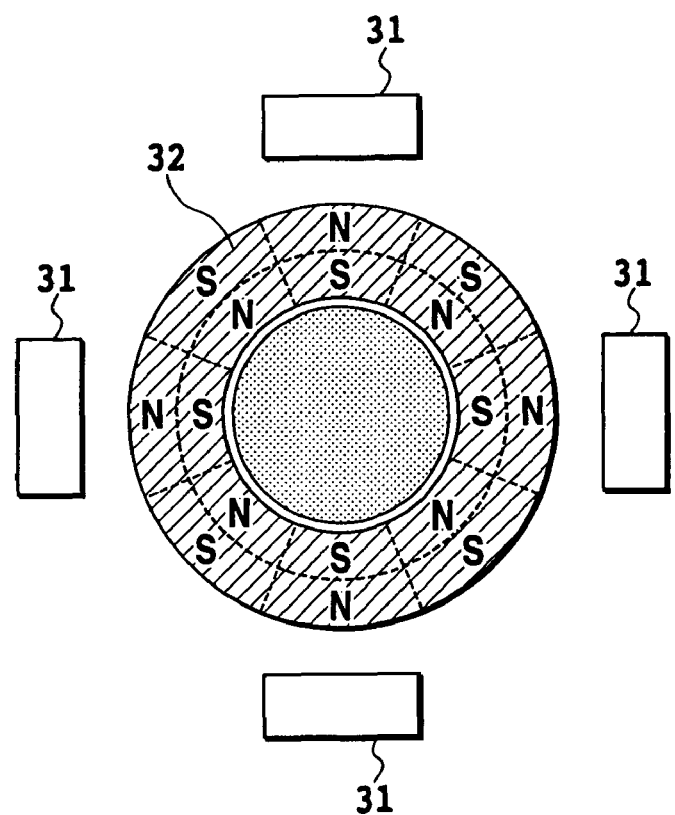

FIGS. 4A and 4B are views each showing still another embodiment of the pointing device in accordance with the present invention. It has a configuration that replaces the internally and externally unipolarly magnetized ring-like magnet in the embodiment shown in FIG. 3A by a magnet internally and externally magnetized in a quadrupole (FIG. 4A) or octupole (FIG. 4B). Using the ring-like magnet 32 with the multipole magnetization can enhance the converging effect of the magnetic flux and increase the directivity. Thus the sensitivity of the pointing device is expected to be increased. As for the number of poles of the ring-like magnet 32, when it is set at an integer multiple of the number of the magnetic sensors 31, the magnetic sensors 31 can be opposed to the pole centers of the ring-like magnet 32 so that the high signal output is expected. In addition, this makes it possible to share a signal processing section. Thus, the ring-like magnet 32 is preferably magnetized at M poles (M=K×I, where K is the number of the magnetic sensors used, and I is an integer equal to or greater than one).

Furthermore, even if the shape of the ring-like magnet 32 is changed to a solid cylindrical magnet, the outer surface of the magnet can be magnetized in the same manner. When the present invention is carried out using a magnet magnetized in multiple poles, a magnet with a shape other than a shape of a ring can also be employed.

Figure 5:
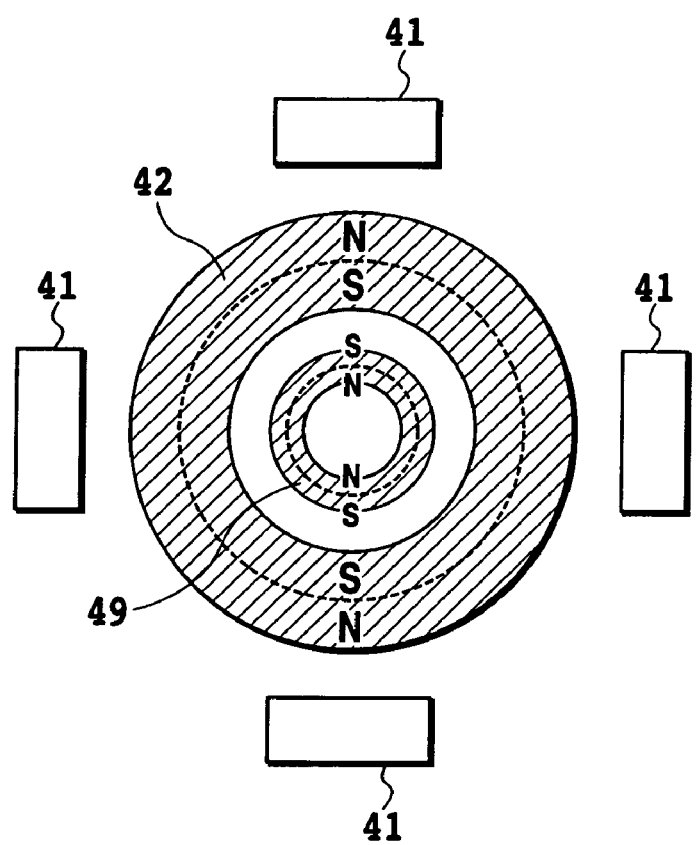
FIG. 5 is a view showing still another embodiment of the pointing device in accordance with the present invention.

FIG. 5 is a view showing still another embodiment of the pointing device in accordance with the present invention. It has a configuration that enhances the origin returning means of the ring-like magnet in the embodiment as shown in FIG. 2A. As described above, although the silicone resin itself has a faculty for returning the ring-like magnet 42 to the origin, the present embodiment has another magnet 49 inside the ring-like magnet 42 to return the ring-like magnet 42 to the origin utilizing the repulsive force between the two magnets. In the present embodiment, the another magnet 49 is an internally and externally unipolarly magnetized magnet provided with the S pole on its outer surface. With such a configuration, the degradation of the origin returning characteristic due to deterioration from aging of the silicone resin can be prevented.

As for all the foregoing embodiments, it is supposed that the Hall elements are used as the magnetic sensors. Since the Hall elements have two output terminals each, the length of the output wiring increases. Thus, the wiring demands a large space and long distance, and hence the device is susceptible to external noise. However, using Hall ICs or semiconductor magneto-resistive elements with a single output terminal as the magnetic sensors enables the reduction in the number of the output signal lines, thereby being able to save space of the printed circuit board and to reduce the effect of the external noise.

In addition, all the foregoing embodiments assume the magnetic sensors that detect the magnetic flux density parallel to the surface of the printed circuit board. However, magnetic sensors for detecting the magnetic flux density that makes an angle (between 0 to 90 degrees) with the surface of the printed circuit board of less than about 60 degrees can offer similar advantages although the S/N of the pointing device is reduced.

Furthermore, as for the foregoing embodiments, since they employ the ring-like magnet magnetized in the outer surface direction, it is expected that the leakage magnetic flux density to the top surface of the switch cover be dramatically reduced. Thus, the problem of losing information of the magnetic card when it is brought close to the magnet can be cleared up.

The present invention is not limited to the foregoing embodiments, but can be modified in a variety of ways.

Next, concrete examples in accordance with the present invention will be described.

Example 1

An example of the output characteristics will be described when the pointing device is constructed with the configuration of the foregoing embodiments in accordance with the present invention.

Figure 6A:
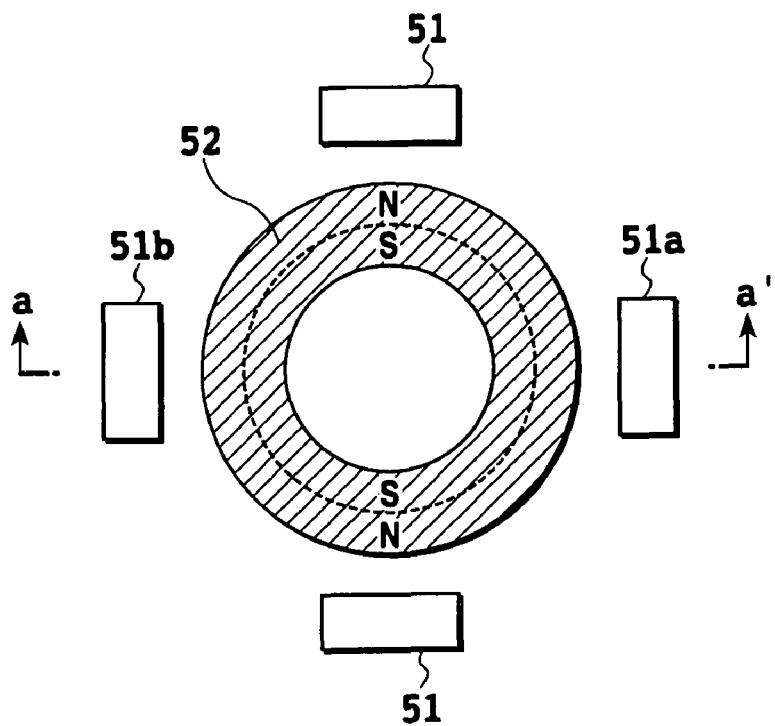
FIGS. 6A and 6B are schematic views showing a configuration of examples 1 and 2 of the pointing device in accordance with the present invention.
Figure 6B:
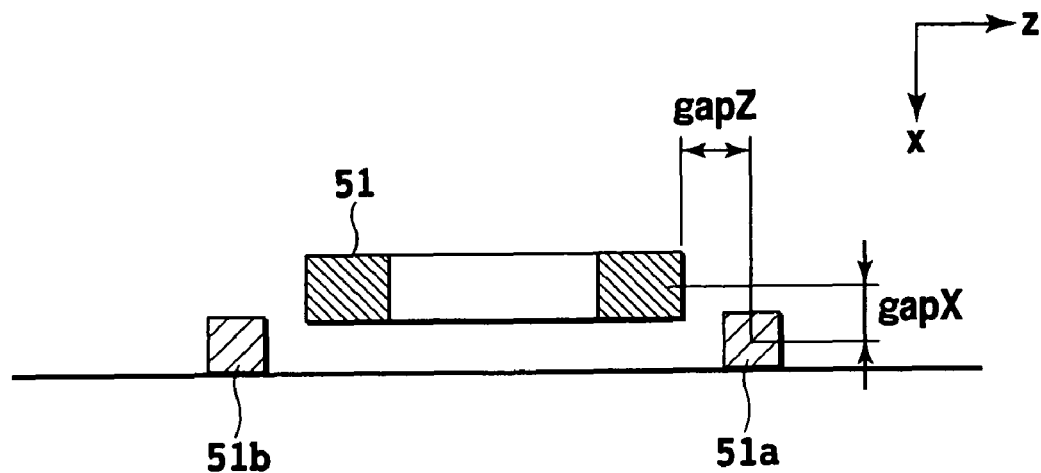

FIGS. 6A and 6B are views showing an example 1 of the pointing device in accordance with the present invention: FIG. 6A is a top view; and FIG. 6B is a cross sectional view taken along the line VIB-VIB of FIG. 6A. The ring-like magnet 52 has φ13 (external diameter)×φ8.8 (internal diameter) and a thickness of 0.5 (all dimensions in mm). The ring-like magnet 52 is internally and externally unipolarly magnetized, the outer side of which is the North pole, and the inner side of which is the South pole. As the ring-like magnet 52, a neodymium bonded magnet is used, the coercive force of which is 460 kA/m. The ring-like magnet 52 is held movably in the z direction of FIG. 6B. The movable range of the ring-like magnet 52 is ±1.2 mm in the z direction. The magnetic sensors 51 are Hall elements that detect the magnetic flux density in the z direction.

Figure 7:
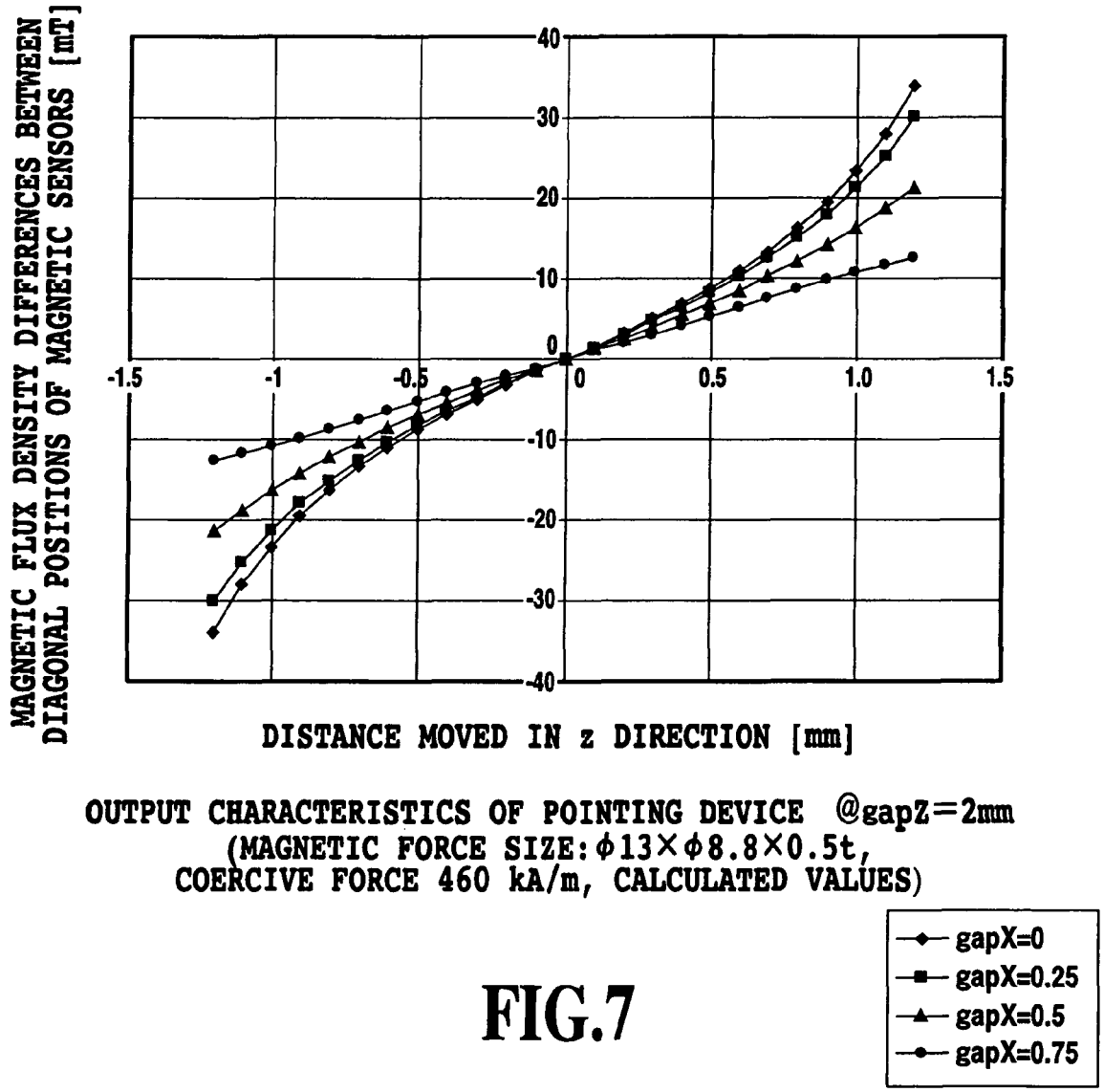
FIG. 7 is a graph illustrating an output characteristic example of the pointing device with the configuration of the example 1.

When the ring-like magnet 52 is placed at the origin, the distance from the external edge of the ring-like magnet 52 to the sensor position of the magnetic sensors 51 in the z direction is denoted by gapZ. Likewise, the distance from the center of the ring-like magnet 52 to the sensor position of the magnetic sensors 51 in the x direction is denoted by gapX. In this case, the ring-like magnet 52 is moved in the z direction up to ±1.2 mm, and differences between the magnetic flux density of the right magnetic sensor 51*a* and that of the left magnetic sensor 51*b* are calculated, the results of which are illustrated in FIG. 7. In this case, the gapZ is set at 2 mm, and the gapX is set at one of four values 0 mm, 0.25 mm, 0.5 mm, and 0.75 mm.

It is found that the magnetic flux density variations equal to or greater than ±20 mT take place when the gapX is set within 0.5 mm, and the ring-like magnet 52 is moved up to ±1.2 mm in the z direction. The values of the magnetic flux density variations are enough to be detected by the Hall elements 51. In addition, it is also found that the magnetic flux density variations increase as the gapX becomes closer to zero, which enables the pointing device to function more effectively.

Figure 8:
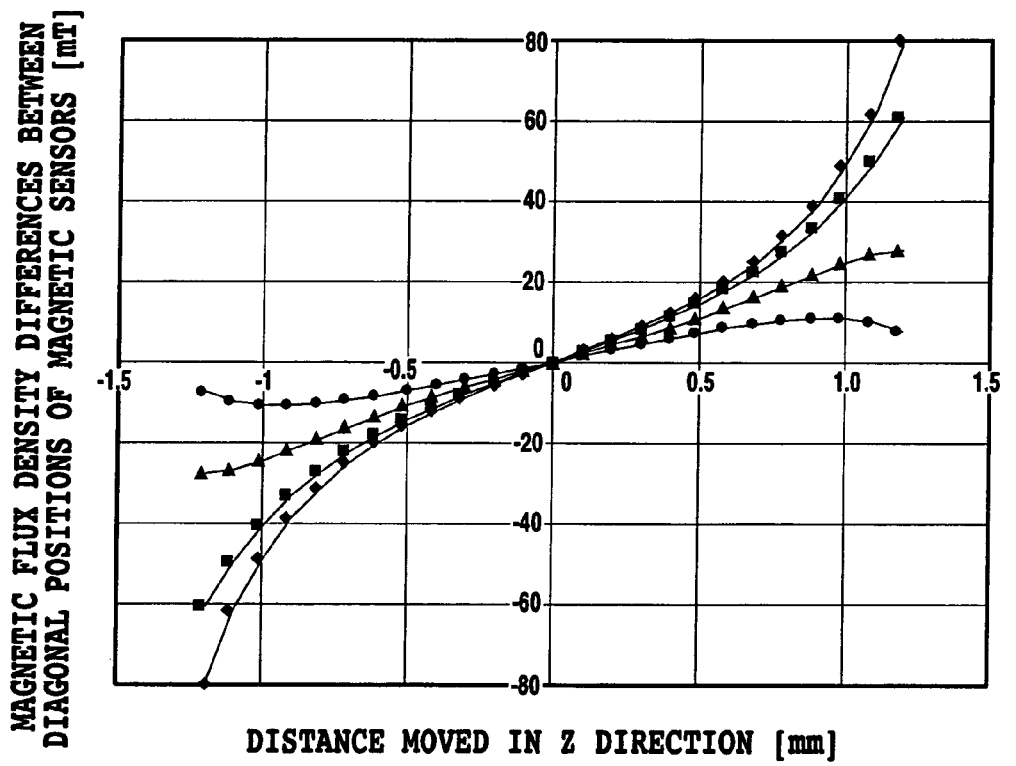
FIG. 8 is a graph illustrating another output characteristic example of the pointing device with the configuration of the example 1.

Likewise, FIG. 8 illustrates the results of calculating the magnetic flux density differences when the gapZ is 1.6 mm. Changing the gapZ from 2 mm to 1.6 mm approximately doubles the values of the magnetic flux density differences. From the foregoing results, it is found that as the values gapZ and gapX are made smaller, the characteristics of the pointing device are improved.

In addition, a particular advantage of the present example 1 of the pointing device is that when the ring-like magnet 52 approaches the limit of the movable range (in the example, in a range where z is equal to or greater than +1.0 mm, or equal to or less than −1.0 mm), the pointing device has a large output. In other words, in a range where z is equal to or greater than 1.0 mm or equal to or less than −1.0 mm, the slopes of the graphs illustrated in FIGS. 7 and 8 increase.

For example, it is usual for a user who moves the cursor from a left end to a right end on a display to wish to move the cursor as quickly as possible. In such a case, the user usually moves the ring-like magnet 52 of the pointing device to the right end of the movable range. In the pointing device in accordance with the present invention, the cursor moves more quickly as it comes closer to the limit of the movable range of the ring-like magnet 52 (that is, the portions in which the slopes of the graphs in FIGS. 7 and 8 are large are utilized). Thus, it can be said that the pointing device in accordance with the present invention has characteristics closer to the human feelings.

In contrast, the conventional pointing device has a problem in that the moving speed of the cursor is reduced as the magnet approaches the limit of its movable range (which will be described in a comparative example described later), and hence the operating feelings are deteriorated. The pointing device in accordance with the present invention can eliminate the foregoing problem, thereby being able to improve the operating feelings remarkably.

Although the magnetic sensors 51 are placed outside the ring-like magnet in present example 1, it is obvious that similar advantages are achieved even if they are placed inside the magnet. In addition, placing them inside the magnet enables further miniaturization.

Example 2

Another example of the output characteristics will be described when the pointing device is constructed with the configuration of the foregoing embodiment in accordance with the present invention.

The main portion of the present example 2 is the same as the foregoing example 1 as shown in FIGS. 6A and 6B. The ring-like magnet 52 has φ11.78 (external diameter)×φ5 (internal diameter) and a thickness of 0.485 (all dimensions in mm). The ring-like magnet 52 is internally and externally unipolarly magnetized, the outer side of which is the North pole, and the inner side of which is the South pole. As the ring-like magnet 52, a neodymium bonded magnet is used, the coercive force of which is 398 kA/m. The ring-like magnet 52 is held movably in the z direction of FIG. 6B. The movable range of the ring-like magnet 52 is ±1.2 mm in the z direction. The magnetic sensors 51 are Hall elements that detect the magnetic flux density in the z direction.

Figure 9:
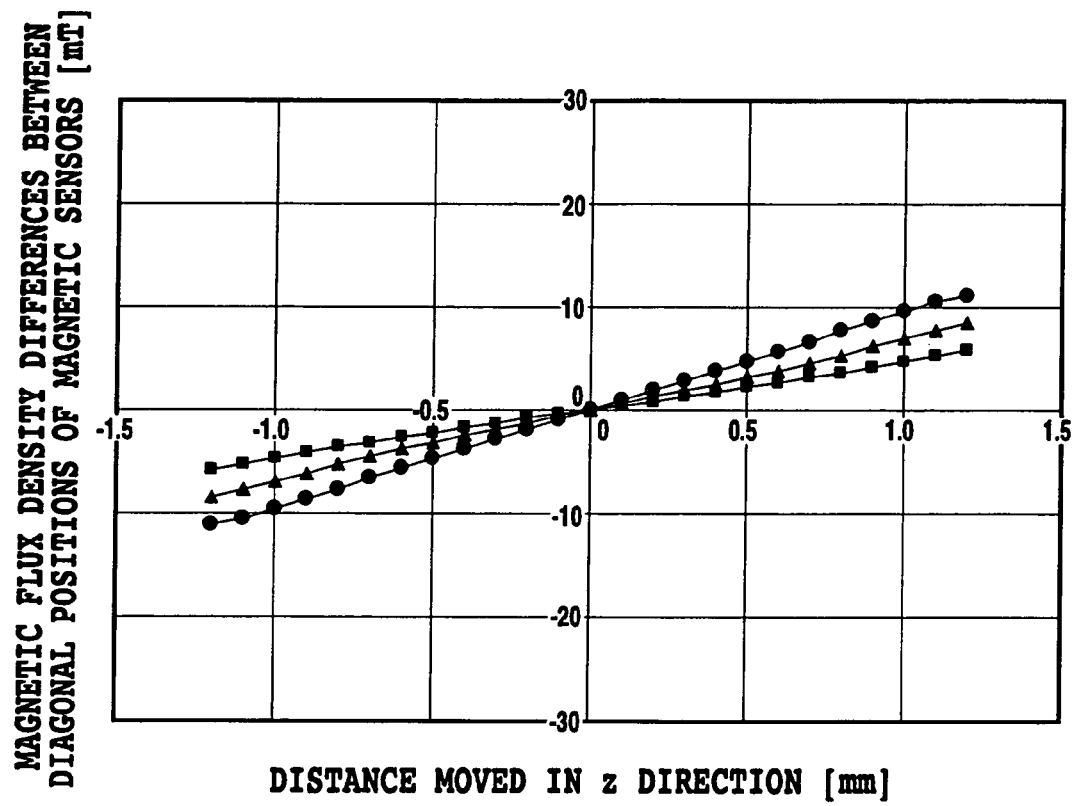
FIG. 9 is a graph illustrating another output characteristic example of the pointing device with the configuration of the example 2.

As in the example 1, when the ring-like magnet 52 is placed at the origin, the distance from the external edge of the ring-like magnet 52 to the sensor position of the magnetic sensors 51 in the z direction is denoted by gapZ. Likewise, the distance from the center of the ring-like magnet 52 to the sensor position of the magnetic sensors 51 in the x direction is denoted by gapX. In this case, the ring-like magnet 52 is moved up to ±1.2 mm in the z direction, and differences between the magnetic flux density of the right magnetic sensor 51a and that of the left magnetic sensor 51b are calculated, the results of which are illustrated in FIG. 9. In this case, the gapZ is set at 0.7805 mm, and the gapX is set at one of three values 3 mm, 2.5 mm and 2 mm.

It is found that only the magnetic flux density variations of about ±10 mT at the most take place when the gapZ is set at 2 mm, and the ring-like magnet 52 is moved up to ±1.2 mm in the z direction. The values of the magnetic flux density variations are rather insufficient to be detected by the Hall elements 51.

To improve the pointing device with the foregoing configuration, the magnetic sensors 51 are replaced by those that detect the magnetic flux density in the direction in the middle of the z direction and x direction, that is, in the direction that makes 45 degrees with the z axis direction and x axis direction, in which the magnetic flux density from the ring-like magnet 52 is large. In the present example 2, the magnetic sensor 51a detects the magnetic flux density in the lower right direction, and the magnetic sensor 51b detects the magnetic flux density in the lower left direction. FIG. 10 illustrates the results of calculating the differences between the magnetic flux density of the right magnetic sensor 51a and that of the left magnetic sensor 51b with moving the ring-like magnet 52 with the foregoing construction up to ±1.2 mm in the z direction.

It is found that the values of the magnetic flux density differences are approximately doubled by replacing the magnetic sensors for detecting the magnetic flux density in the z direction by the magnetic sensors for detecting the magnetic flux density in the direction that makes 45 degrees with the z direction. From the results, it is preferable that the detection direction of the magnetic sensors be changed appropriately in accordance with the positional relation between the ring-like magnet 52 and the magnetic sensors 51 rather than limited to the z direction. However, as a guide of the detection direction of the magnetic flux density of the magnetic sensors, it is known that good results are obtained by setting the angle with the z direction at about 60 degrees or less.

In addition, an advantage of the present example 2 of the pointing device is that when the ring-like magnet 52 approaches the limit of the movable range (in the example, in a range where z is equal to or greater than +1.0 mm, or equal to or less than −1.0 mm), the pointing device has a large output. In other words, in the range where z is equal to or greater than 1.0 mm or equal to or less than −1.0 mm, the slopes of the graphs illustrated in FIG. 10 increase.

Although the magnetic sensors 51 are placed outside the ring-like magnet in the present example 2, it is obvious that similar advantages are achieved even if they are placed inside the magnet. In addition, placing them inside the magnet enables further miniaturization.

Example 3

Figure 11A:
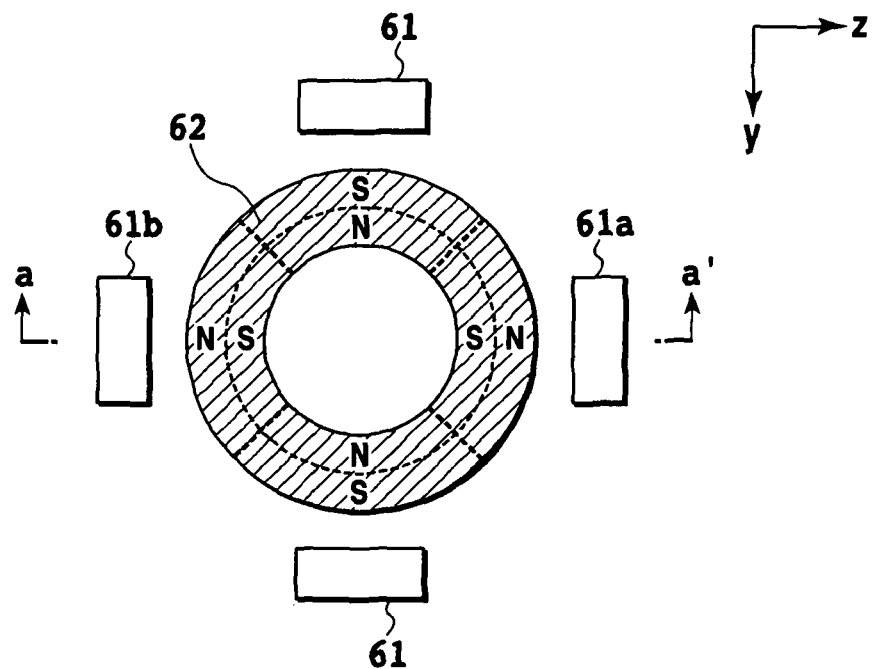
FIGS. 11A and 11B are schematic views showing a configuration of an example 3 of the pointing device in accordance with the present invention.
Figure 11B:
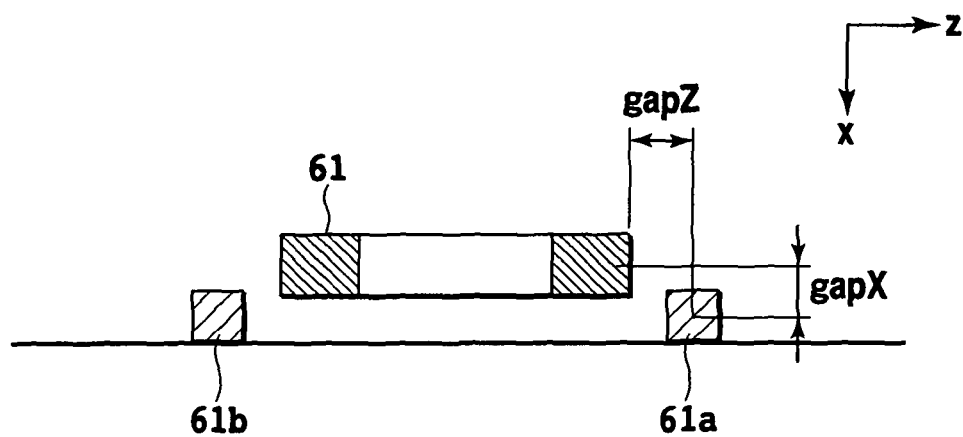

FIGS. 11A and 11B are views showing an example 3 of the pointing device in accordance with the present invention: FIG. 11A is a top view; and FIG. 11B is a cross sectional view taken along the line XIB-XIB of FIG. 11A, which show an example that replaces the internally and externally unipolarly magnetized ring-like magnet 52 used by the example 1 by a multipolarly magnetized ring-like magnet 62. The ring-like magnet 62 has φ12 (external diameter)×φ8 (internal diameter), and a thickness of 1 (all dimensions in mm). The ring-like magnet 62 is magnetized in multipolar fashion as shown in FIG. 11A. As the ring-like magnet 62, a neodymium bonded magnet is used. The ring-like magnet 62 is held movably in the z direction and y direction. The movable range of the ring-like magnet 62 is ±1 mm in the z direction and y direction, respectively. The magnetic sensors 61 are Hall elements: those placed at the right and left hand sides of the ring-like magnet 62 in FIG. 11A detect the magnetic flux density in the z direction; and those placed upper and lower sides of the ring-like magnet 62 detect the magnetic flux density in the y direction.

Figure 12:
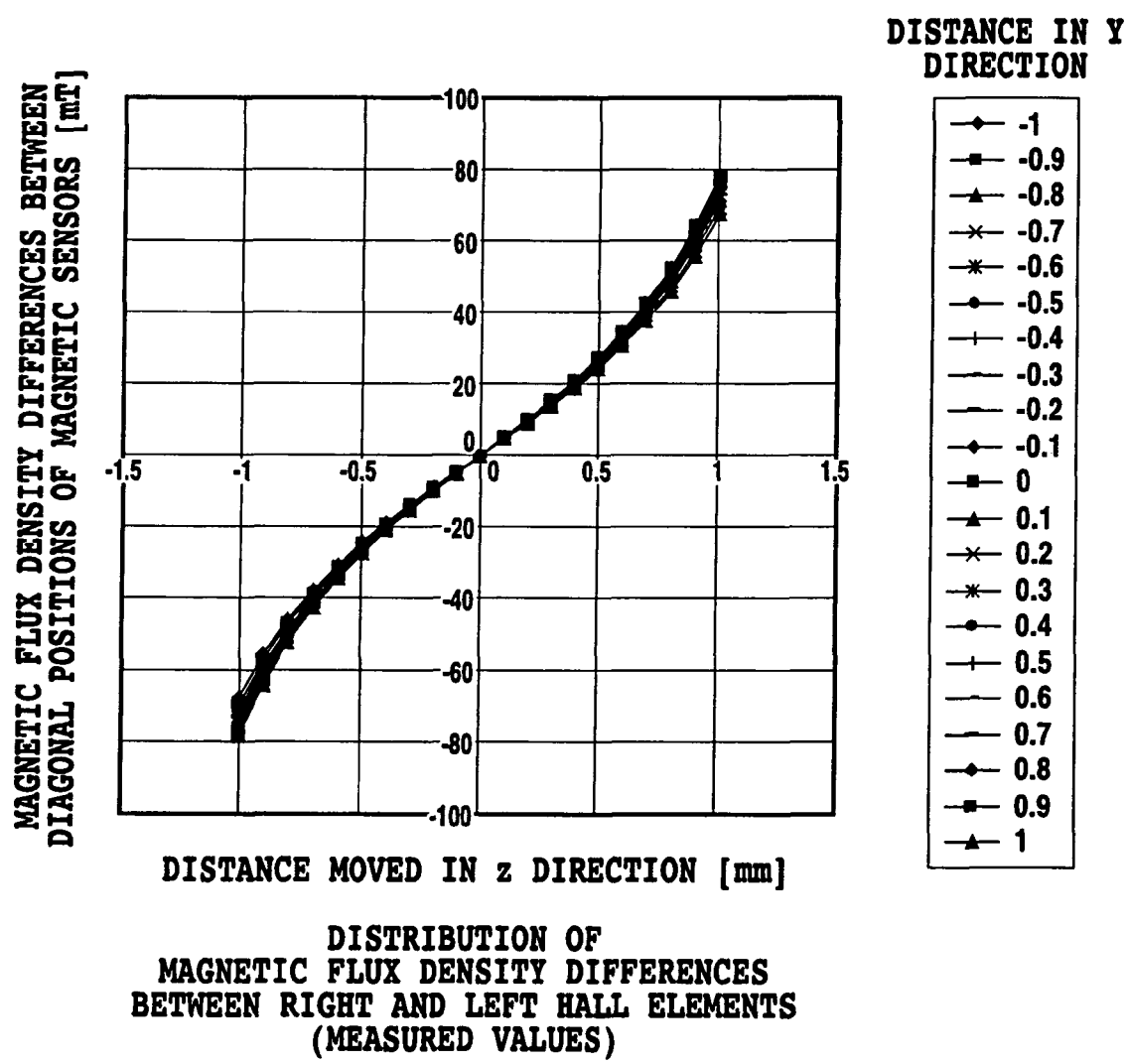
FIG. 12 is a graph illustrating an output characteristic example of the pointing device with the configuration of the example 3.

When the ring-like magnet 62 is placed at the origin, the distance gapZ from the external edge of the ring-like magnet 62 to the sensor position of the magnetic sensors 61 in the z direction is set at 1.6 mm. Likewise, the distance gapX from the center of the ring-like magnet 62 to the sensor position of the magnetic sensors 61 in the x direction is set at 0 mm. In this case, the ring-like magnet 62 is moved up to ±1 mm in the z direction and y direction, and differences between the magnetic flux density of the right magnetic sensor 61a and that of the left magnetic sensor 61b are calculated, the results of which are illustrated in FIG. 12.

As in the example 1, good output characteristics of the pointing device can be confirmed. In addition, it is found that the characteristics of the pointing device are nearly independent of the position in the y direction. It is also found that the slopes of the graphs increase at positions close to the limit of the movable range of the ring-like magnet 62, which enables the improvement in the operating feeling of the pointing device.

Although the present example 3 uses the ring-like magnet 62, it is obvious that similar advantages can be achieved by using a solid cylindrical magnet whose outer surface is magnetized in the same manner. Furthermore, although the present example 3 has the internal and external walls of the ring-like magnet 62 magnetized in a quadrupole manner, this is not essential. For example, it is obvious that the multipolar magnetization other than the quadrupole magnetization can achieve similar advantages.

Comparative Example

Output characteristics of a configuration of a conventional magnetic detection type pointing device will be described.

Figure 13:
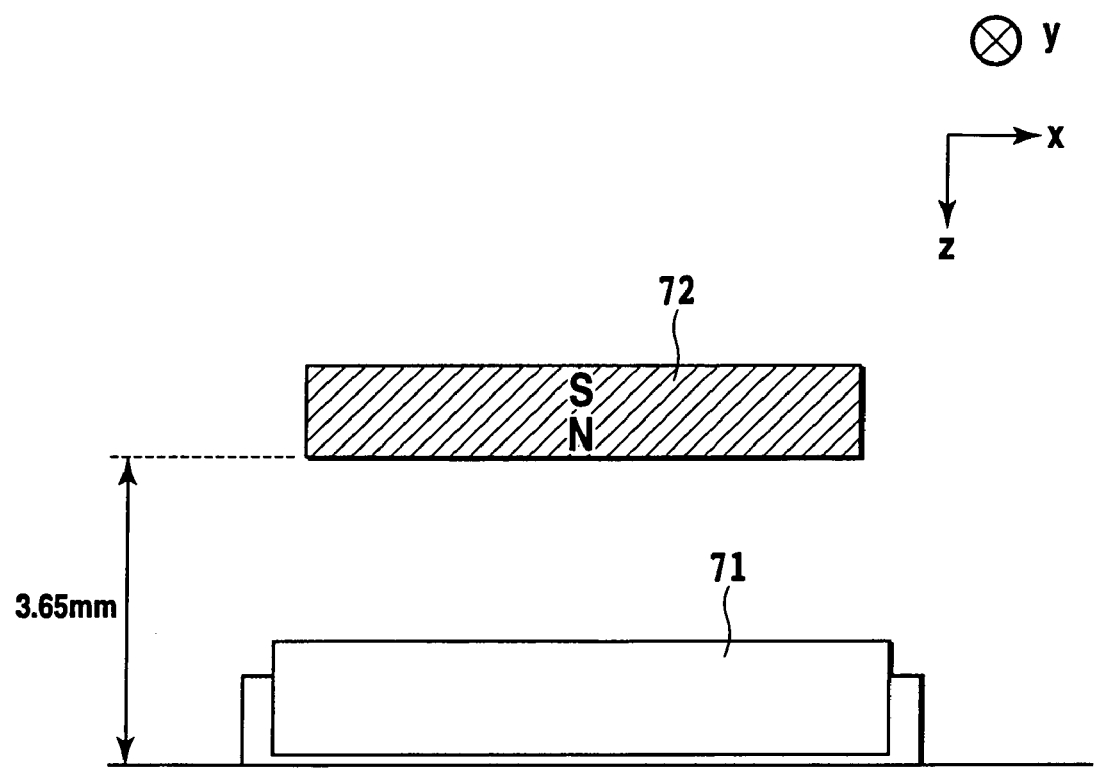
FIG. 13 is a schematic view showing a configuration of a conventional pointing device.
Figure 14:
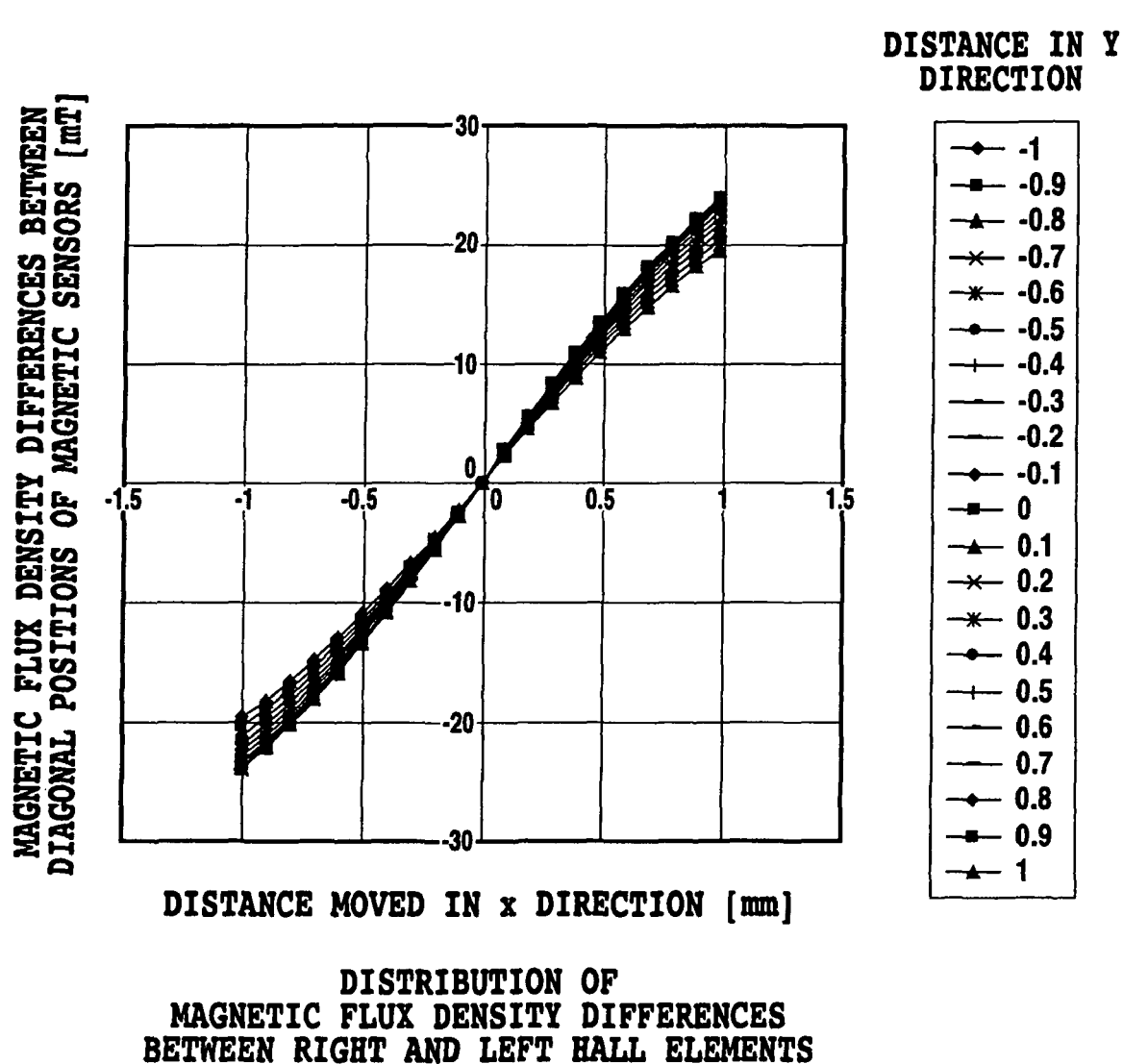
FIG. 14 is a graph illustrating output characteristics of the conventional pointing device as shown in FIG. 13.

FIG. 13 is a schematic diagram showing a configuration of a conventional pointing device. A magnet 72 is a 3.9 mm square by 0.8 mm thick magnet. The magnet 72 is magnetized in the z direction as shown in FIG. 13. As the magnet 72, a neodymium sintered magnet is used. In addition, it is held movably in the x direction and y direction in FIG. 13. The movable range of the magnet 72 is ±1 mm in both the directions. The magnetic sensors 71 are Hall device HQ8002 (trade name) of Asahi Kasei Electronics Co. Ltd., which includes four Hall elements in a single package. The Hall elements are for detecting the magnetic flux density in the z direction. In addition, the distance between the Hall elements at the diagonal positions is 3.2 mm. FIG. 14 illustrates the measured results of the differences between the magnetic flux density of the right magnetic sensor section and that of the left magnetic sensor section in HQ8002, when the magnet 72 is moved up to ±1 mm in the x direction and y direction.

It is found that when the magnet 72 approaches the limit of the movable range (when x is close to +1.0 mm or −1.0 mm in the example), the output of the pointing device is reduced. In other words, when x is close to 1.0 mm or −1.0 mm, the slopes of the graphs of FIG. 14 are reduced.

For example, it is usual for a user who moves the cursor from a left end to a right end on a display to wish to move the cursor as quickly as possible. In such a case, the user usually moves the magnet 72 of the pointing device to the right end of the movable range. In the pointing device of the present comparative example, since the cursor moves more slowly as the magnet 72 approaches the limit of the movable range (that is, the portions in which the slopes of the graphs of FIG. 14 are small are utilized), it is said that the pointing device has characteristics different from the human feelings. Thus, it deteriorates the operating feelings expected by the user, and hence the need for its improvement is undeniable.

In addition, the output characteristics vary depending on the position in the y direction, which also impairs the operating feelings expected by the user.

INDUSTRIAL APPLICABILITY

It is possible for the magnetic detection type pointing device to provide good operating feelings, to reduce the size and height, to reduce the leakage magnetic flux density to the outside, and to lengthen the product life. Thus, a pointing device can be provided which is suitably applicable to a variety of applications.

The invention claimed is:

1. A pointing device comprising:
a ring-like magnet that is movably supported in a plane to move to various locations within that plane, and is magnetized such that said ring-like magnet comprises pairs of inner and outer ring sections of north and south magnetization that are both in said plane and each pair of said north and south sections is at a same angle along a radius of said ring-like magnet; and
a plurality of magnetic sensors for detecting magnetic flux density produced by said ring-like magnet in a direction parallel to said plane are placed outside said ring-like magnet, wherein
said magnetic sensors are disposed symmetrically from each other to said ring-like magnet, and
said magnetic sensors are positioned to detect variations in the magnetic flux density in the direction parallel to said plane, the variations being caused by movement of said ring-like magnet in a direction parallel to said plane,
wherein said inner ring sections are of both north and south magnetization such that inner ring sections of north magnetization are placed in an alternative manner with respect to inner ring sections of south magnetization along an inner circumference of said ring-like magnet.

2. The pointing device as claimed in claim 1, further comprising a printed circuit board on which a resin layer with elastic deformation is provided, wherein said ring-like magnet is fixed to said resin layer, and said ring-like magnet is movably supported in parallel to said printed circuit board, said magnetic sensors are placed on said printed circuit board.

3. The pointing device as claimed in claim 1, wherein said magnetic sensors are magnetic sensors utilizing Hall effect, and the output signals are proportional to the magnetic flux density.

4. The pointing device as claimed in claim 1, wherein said magnetic sensors are magnetic sensors utilizing magneto-resistive effect.

5. The pointing device as claimed in claim 1, further comprising an origin returning means for returning said ring-like magnet to the origin using magnetic force generated by said ring-like magnet.

6. The pointing device as claimed in claim 1, wherein said magnetic sensors are disposed and faced to one of the outer ring sections of said ring-like magnet.

7. The pointing device as claimed in claim 2, wherein said resin layer and said printed circuit board have their opposing faces not bonded to each other.

8. The pointing device as claimed in claim 2, wherein said resin layer is an elastic sheet.

9. The pointing device as claimed in claim 2, wherein said resin layer is a silicone resin.

10. The pointing device as claimed in claim 2, further comprising a switch on the resin layer side of said printed circuit board and at about the center of said ring-like magnet.

11. The pointing device as claimed in claim 10, further comprising a projection for depressing said switch at a portion facing said switch on said resin layer.

12. The pointing device as claimed in claim 3, wherein said magnetic sensors utilizing the Hall effect are disposed on the resin layer side of said printed circuit board to detect the magnetic flux density in a direction parallel to the surface of said printed circuit board.

13. The pointing device as claimed in claim 3, wherein said magnetic sensors utilizing the Hall effect are magnetic sensors with a single output terminal.

14. The pointing device as claimed in claim 4, wherein said magnetic sensors utilizing the magneto-resistive effect are semiconductor magneto-resistive elements which are disposed on the resin layer side of said printed circuit board to detect the magnetic flux density in a direction parallel to the surface of said printed circuit board.

15. The pointing device as claimed in claim 4, wherein said magnetic sensors utilizing the magneto-resistive effect are four semiconductor magneto-resistive elements disposed symmetrically on X and Y axes, which are two axes on a two dimensional plane of an orthogonal system, wherein two magnetic sensors on the X axis are electrically connected at a first connection point;
and two magnetic sensors on the Y axis are electrically connected at a second connection point, and wherein said pointing device detects variations in ambient magnetic flux density caused by movement of said ring-like magnet using electric signals at the first and second connection points.

16. An electronic device incorporating the pointing device as defined in any one of claims 1, 2, 3-6, 7-9, 10, 11, 12, 13, 14, and 15.

17. The pointing device as claimed in claim 1, wherein said ring-type magnet is magnetized at M sets of north-south poles, where M=K×I, K equals the number of magnetic sensors, and I is an integer equal to or greater than one.

18. A pointing device comprising:
a ring-like magnet that is movably supported in a plane to move to various locations within that plane, and is internally and externally magnetized along said ring in said plane such that said ring-like magnet comprises inner and outer pairs of ring sections of north and south magnetization that are both in said plane and each pair of said north and south magnetization that are both in said plane and each pair of north and south sections is at a same angle along a radius of said ring-like magnet; and
a plurality of magnetic sensors wherein said plurality of magnetic sensors are positioned such that a distance from an intersection of half way between an upper and lower surface of said ring-like magnet and a half way point of said magnetic sensors is within a range from 0 to 0.75 mm in a vertical direction to said plane,
wherein said magnetic sensors are positioned to detect variations in the magnetic flux density in a direction parallel to said plane, the variations being caused by movement of said ring-like magnet,
wherein the internal magnetization of said ring-like magnet contains sections of north magnetization placed in an alternative manner with respect to sections of south magnetization along an inner circumference of said ring-like magnet.

19. The pointing device as claimed in claim 18, wherein said magnetic sensors are magnetic sensors utilizing magneto-resistive effect.

20. The pointing device as claimed in claim 19, wherein said magnetic sensors utilizing the magneto-resistive effect are four semiconductor magneto-resistive elements disposed symmetrically on X and Y axes, which are two axes on a two dimensional plane of an orthogonal system, wherein two magnet sensors on the X axis are electrically connected at a first connection point; and two magnetic sensors on the Y axis are electrically connected at a second connection point, and wherein said pointing device detects variations in ambient magnetic flux density caused by movement of said ring-like magnet using electric signals at the first and second connection points.

21. The pointing device as claimed in the claim 18, wherein said ring-like magnet is internally and externally unipolarly magnetized.

22. The pointing device as claimed in claim 18, wherein said ring-like magnet is internally and externally magnetized in a multipolar manner in the direction of its circumference, and said magnetic sensors are faced to a magnetic pole of said ring-like magnet magnetized in a multipolar manner.

23. The pointing device as claimed in claim 18, wherein said magnetic sensors are disposed symmetrically on X and Y axes, which are two axes on a two dimensional plane of an orthogonal system, and said ring-like magnet is placed near said magnetic sensors.

24. The pointing device as claimed in claim 18, wherein said magnetic sensors are magnetic sensors utilizing Hall effect, and the output signals are proportional to the magnetic flux density.

25. The pointing device as claimed in claim 24, wherein said magnetic sensors utilizing the Hall effect are magnetic sensors with a single output terminal.

26. The pointing device as claimed in claim 18, further comprising an origin returning means for returning said ring-like magnet to the origin using magnetic force generated by said ring-like magnet.

27. The pointing device as claimed in claim 18, further comprising a printed circuit board on which a resin layer with elastic deformation is provided, a switch on the resin layer side of said printed circuit board and at about the center of said ring-like magnet, and a projection for depressing said switch at a portion facing said switch on said resin layer.

28. The pointing device as claimed in claim 27, wherein said resin layer and said printed circuit board have their opposing faces not bonded to each other.

29. The pointing device as claimed in claim 27, wherein said resin layer is an elastic sheet.

30. The pointing device as claimed in claim 27, wherein said resin layer is a silicone resin.

31. An electronic device incorporating the pointing device as defined in claim 18.

32. The pointing device as claimed in claim 18, wherein said distance in the vertical direction is within 0 and 0.5 mm.

33. The pointing device as claimed in claim 18, wherein said distance in the vertical distance is within 0 and 0.25 mm.

34. The pointing device as claimed in claim 1, wherein said outer ring sections are of both north and south magnetization such that outer ring sections of north magnetization are placed in an alternative manner with respect to outer ring sections of south magnetization along an outer circumference of said ring-like magnet.

35. The pointing device as claimed in claim 34, wherein said inner ring sections of north magnetization are placed opposite to said outer ring sections of south magnetization, and said inner ring sections of south magnetization are placed opposite to said outer ring sections of north magnetization.

* * * * *